United States Patent Office 3,316,215
Patented Apr. 25, 1967

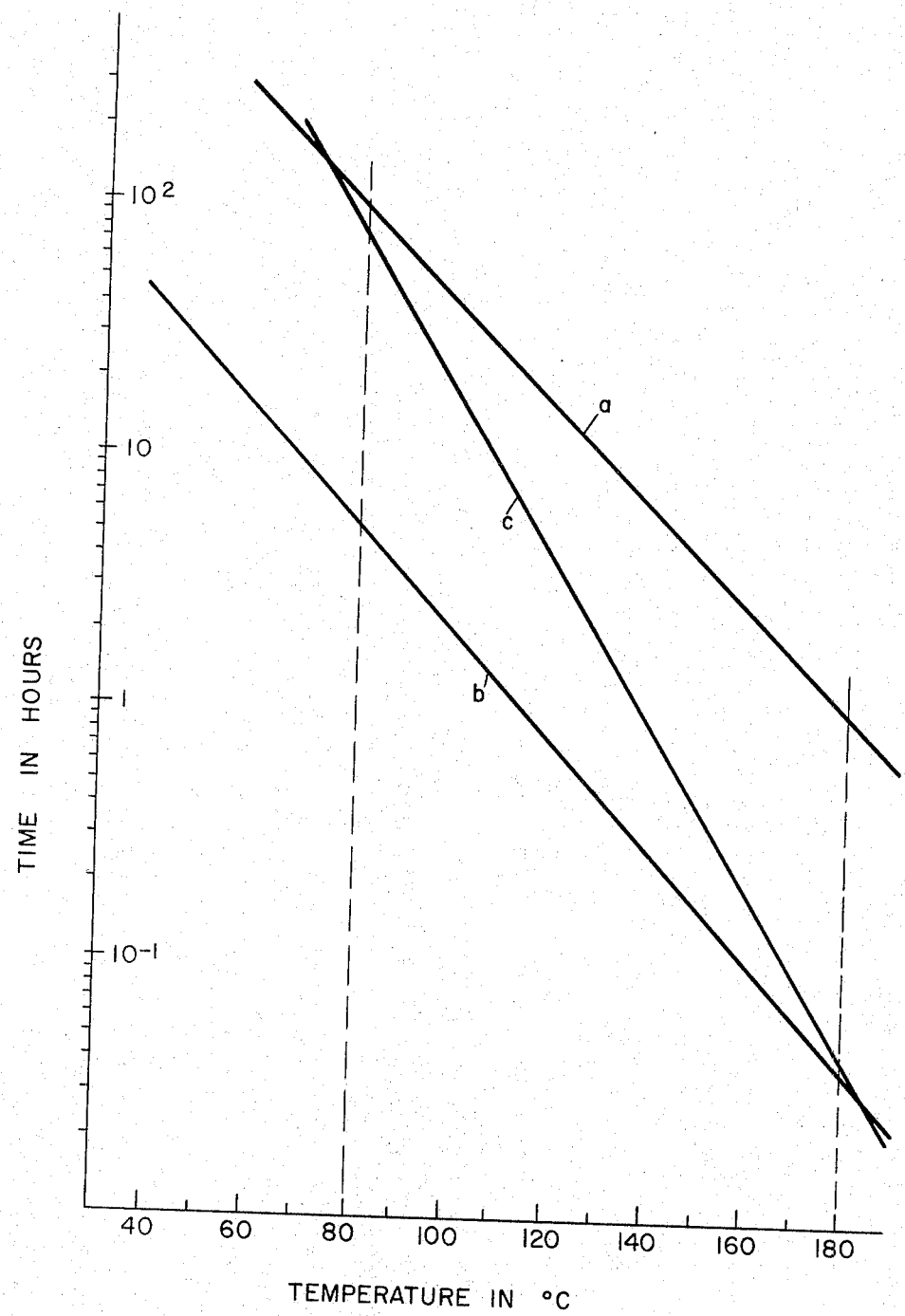

3,316,215
EPOXY RESIN AND METHOD OF ACCELERATING THE CURING PROCESS THEREOF
Werner Möller, Regensdorf, Switzerland, assignor to Oerlikon Engineering Company, Zurich, Switzerland, a corporation of Switzerland
Filed Feb. 23, 1965, Ser. No. 434,192
7 Claims. (Cl. 260—47)

This invention relates generally to epoxy resins, and has particular reference to a procedure whereby the curing process can be accelerated without sacrifice of other desirable characteristics of the resin.

High-voltage insulating substances consist frequently of an insulating carrier such as a glass-fiber fabric firmly bonded, with as few hollow spaces as possible, with an insulating material, most commonly mica. The binding agent must meet a number of requirements. In order to produce a non-porous bond it should be largely free of solvents and should not give off volatile substances. Also, a low viscosity is required so that complete saturation of the carrier can be achieved, and it should have a low vapor pressure to facilitate vacuum impregnation. An ability to harden quickly at the lowest possible temperature is also important. Finally, special qualities of a mechanical, dielectric and thermal nature, and other qualities, are called for.

It is known that epoxy resins and unsaturated polyester resins, as well as mixtures thereof, have been used as binding agents for high-voltage insulating substances.

Epoxy resins involve substances having more than two ethylene oxide rings. The industrially most important epoxy resin type is formed by the condensation of epichlorhydrin with bis-(4-hydroxyphenyl)-dimethyl-methane, i.e., bis-phenol A. It has the following structural formula:

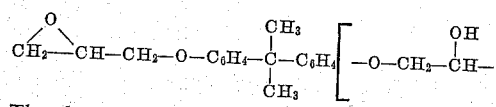 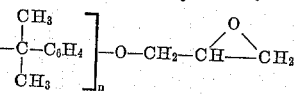

The degree of condensation is characterized by the index $n$ which is usually between zero and 2, although in exceptional cases it may be as large as 7. The reactivity can be described in terms of epoxy equivalent weight. This is required for determination of hardener to be added, and is given in terms of grams of resin containing one mole of epoxy oxygen. For the resin types which are liquid at 25° C., the epoxy equivalent weight is generally between 150 and 350, while solid types have values up to 4000. The epoxy resins (more precisely, their ethylene oxide groups) can be cross-linked with multifunctional carboxylic acids and their derivatives, with amines, amides, phenol or amine-formaldehyde condensates, with polyesters or alcohols, or (by the use of catalysts, e.g., in the presence of boron-trifluoride-amine complexes) with themselves, to form products of high molecular weight. In addition to the ethylene oxide groups, the hydroxyl groups which are usually present in epoxy resins are also able to react in this manner.

Epoxy resins have found wide acceptance because their vapor pressure, their flammability, their heat of reaction, and their shrinkage upon hardening are relatively small, while their mechanical strength and especially their ability to bond with metals and with the usual insulating materials are high. This is particularly the case where the hardeners employed are carboxylic acid anhydrides which enter into an additional polymerization reaction with the resins.

However, a disadvantage resides in the fact that epoxy resins having long periods of usefulness, i.e., having a slow rate of increase in viscosity (which is desirable because of good storage stability and minimum waste) also require very long hardening periods. This difficulty cannot be overcome by raising the hardening temperature because this is limited by the resin's heat resistance, and moreover the temperature of use (i.e., of impregnation) of the resin and the hardening temperature should be as near to each other as possible so that internal stresses and possible ruptures, likely to impair insulation qualities, may be avoided. Nor can the situation be remedied by accelerators such as tertiary amines or derivatives, phosphines, sulfoxides, boron trifluoride-amine complexes, amides, phenols, glycols, ethers, heavy metal complexes, etc., because they also accelerate the polymerization reaction at the impregnating temperatures. As a result, the advantage of a shortened hardening period is outweighed by a reduction in the period of usefulness of the resin.

The enumerated shortcomings of epoxy resins can be overcome by means of the present invention. A feature of the improved procedure resides in the employment of sodium as an accelerator, and in the introduction of the sodium into the resin in the form of an alcoholate. Thus, in accordance with this invention, anhydrous bis-phenol-A-diglycidyl-ether having an epoxy equivalent weight between 150 and 500 is caused to incorporate from 0.015 to 0.15 percent, by weight, of sodium. An equivalent amount of carboxyl anhydride hardener is then added, whereupon the hardener reacts with the sodium to form a sodium salt and this in turn facilitates the reaction of the activated hardener with the epoxy groups of the bis-phenol-A-diglycidyl-ether.

An effective way to produce the sodium alcoholate is to stir 100 parts by weight of anhydrous bis-phenol-A-diglycidyl-ether, containing hydroxyl groups and having an epoxy equivalent weight between 150 and 500, with 0.005 to 2.0 parts by weight of sodium, the stirring being carried out first for a period of at least two hours at temperatures of 20–30° C. and under exclusion of oxygen, then for at least two more hours at a temperature of at least 40° C. and not exceeding 100° C. Under these conditions the sodium combines with the hydroxyl groups of the bis-phenol-A-diglycidyl-ether, with separation of hydrogen.

The sodium alcoholate can also be produced by stirring sodium in the same proportions and under the same conditions with 100 parts by weight of a polypropane-diol having a molecular weight of about 400. The sodium reacts with the polypropane-diol, with separation of hydrogen.

The advantage of the invention is that a resin system is obtained whose reactivity increases very rapidly only at higher temperatures. This is illustrated by the curves, experimentally derived, shown on the accompanying drawing. The abscissa represents temperature in degrees centigrade, and the ordinate depicts time, in hours, on a logarithmic scale. The parameter is viscosity, which in the present example has been arbitrarily chosen to have value of 1000 centistokes. The measurements shown were made with capillary viscosimeters adapted to determine kinematic viscosity in terms of stokes or centistokes. As is known, multiplication of this value by the density gives the dynamic viscosity in terms of the poise unit.

The graph indicates the time required for each of various resin types to attain a viscosity of 1000 centistokes at any given temperature.

The line $a$ shows the characteristics of a composition of bis-phenol-A-diglycidylether embodying carboxylic acid anhydride as hardener. The line $b$ shows the altered characteristics resulting from the addition, in known manner, of a conventional accelerator consisting of 0.3 part by weight of tri (dimethyl-amino-methyl) phenol (also known as "DMP-30") per 100 parts by weight of epoxy resin. A comparison of the lines $a$ and $b$ shows that it is possible by the usual accelerator to shorten the hardening period, e.g., at 180° C. However, the period of use, e.g., at an impregnation temperature of 80° C., is also considerably reduced.

On the other hand, if sodium alcoholate is first added to the epoxy resin in the prescribed manner, and then carboxylic acid anhydride is added as hardener, the pattern $c$ is obtained. Again assuming an impregnation temperature of 80° C. and a hardening temperature of 180° C. as a basic of comparison, it will be seen that the composition corresponding to line $c$ has approximately the same use period as the composition corresponding to $a$, yet allows hardening to occur about as rapidly as in the case of the composition corresponding to $b$.

It is thus possible to obtain both long use periods and quite short hardening periods. It is important to note that, additionally, the composition having characteristics corresponding to line $c$ embodies outstandingly desirable qualities of a mechanical, thermal, and dielectric nature.

Epoxy resins prepared in accordance with the described procedure are excellently suited for the insulation of electric machines and equipment, and for impregnation and envelopment of selected parts thereof.

Both of the following examples afford details of the several steps of the process:

Example I 100 grams of an anhydrous bis-phenol-A-diglycidyl-ether containing hydroxyl groups and having an epoxy equivalent weight of about 190, available by the designation "Araldit CY 205" (trademark of Ciba A.G.) or "Epikote 828" (trademark of Shell Oil Co.) were stirred with 0.5 gram of finely cut sodium, under vacuum (1 torr) for a period of 4 hours at a temperature of 20°–30° C. Thereafter the stirring was continued for 3 more hours at about 40° C. and for a further 3 hours at about 70° C. This caused the sodium to react, while hydrogen split off. Subsequently the resin was filtered by means of a suction filter in order to separate out solid matter, and the sodium content was determined titrimetrically. Finally fresh anhydrous epoxy resin was added in an amount sufficient to bring the sodium content to the desired range of between 0.015 and 0.15 percent.

Example II 100 grams of a polypropane diol having a molecular weight of about 400 were stirred with 2.0 grams of finely divided sodium, under vacuum (1 torr), for successive 3-hour periods at temperatures of 20°–30° C., 50° C., and 80° C., respectively. In a reaction more vigorous than that of Example I the sodium became transformed to sodium alcoholate while hydrogen separated out. Then the composition was filtered and the sodium content determined. Finally, by addition of fresh polypropane diol the proportion of sodium was adjusted to the desired value. The accelerator was then added to a resin of the type described in Example I in the quantity required to establish the desired proportion of sodium in the range from 0.015 to 0.15 percent.

The treated resin is eminently suitable for the insulation of electrical equipment and the like, e.g., as an impregnating medium for a micaceous fabric or carrier. It is curable by the addition of carboxylic acid anhydride as a hardener, and it has a higly desirable inherent ability to remain stable at lower temperatures but to harden with increased speed at elevated curing temperatures. Moreover, the insulation qualities and other desirable properties of the resin remain substantially the same, after the sodium alcoholate treatment, as before. Additionally, the treated resin has excellent storage capabilities. At 20° C., for example, a sodium-treated epoxy resin of the character described can retain its usefulness for periods of well over 12 months.

The temperatures to which such a resin is subjected when used (e.g., during an impregnation procedure) are usually between 70° and 100° C., depending upon the nature of the product to be impregnated. Its viscosity at these temperatures may be in the range of, say, 50 to 15 centistokes, and the viscosity remains at useful values (i.e., below about 100 centistokes) for periods of time which can vary from about 40 hours at 70° C. to about 17 hours at 100° C.

Illustrative temperatures employed during the hardening of such a resin are between 140° and 180° C. For example, in carrying out the hardening of the treated resin described in Example I with carboxylic acid anhydride as the hardener, a temperature of 140° to 150° C. may be maintained for a period of 3 hours while a temperature of the order of 180° C. may be thereupon maintained for a further period of from 2 to 4 hours.

These particulars are of course merely illustrative. Of primary significance is the fact that the improved resin embodies an accelerator which does not materially speed up any viscosity increase at lower temperatures of storage or use, but brings about a greatly accelerated increase in viscosity when the resin is mixed with a carboxylic anhydride hardener at relatively elevated curing temperatures.

What is claimed is:

1. A process for accelerating the curing of an epoxy resin at a hardening temperature without correspondingly accelerating an increase in its viscosity at lower temperatures of use, which consists in incorporating from 0.015 to 0.15 percent, by weight, of sodium in a resin composed of anhydrous bis-phenol-A-diglycidyl-ether containing hydroxyl groups and having an epoxy equivalent weight between 150 and 500.

2. A process as defined in claim 1, in which the sodium is incorporated into the resin in the form of sodium alcoholate.

3. A process as defined in claim 2, in which the sodium alcoholate is produced by adding 0.005 to 2.0 percent, by weight, of sodium to the resin, stirring the mixture in the absence of oxygen at temperatures between 20° C. and 100° C. for a period of time sufficient to cause the sodium to react with the hydroxyl groups, and adding fresh resin until the proportion of sodium is within the desired range.

4. A process as defined in claim 3, in which the stirring is performed for at least two hours at temperatures of 20–30° C., then for at least two more hours at a temperature no less than 40° C. and no more than 100° C.

5. A process as defined in claim 2, in which the sodium alcoholate is preliminarily prepared by adding sodium to a polypropane-diol having a molecular weight of about 400, the sodium used being 0.005 to 2.0 percent, by weight, and stirring the mixture in a vacuum at temperatures between 20° C. and 80° C. for a period of time sufficient to cause the sodium to react with the polypropane-diol.

6. A process as defined in claim 5, in which the stirring is performed for successive three-hour periods at temperatures of 20–30° C., 50° C., and 80° C., respectively.

7. An epoxy resin suitable for the insulation of electrical equipment and curable by the addition of carboxylic acid anhydride as a hardener, consisting of anhydrous bisphenol-A-diglycidyl-ether containing hydroxyl groups and having an epoxy equivalent weight between 150 and 500, and from 0.015 to 0.15 percent, by weight, of sodium incorporated therewith, said resin having a viscosity which rises rapidly only at elevated temperatures whereby its curing at a hardening temperature is accelerated although its periods of usefulness at lower temperatures are relatively unaffected.

No references cited.

WILLIAM H. SHORT, *Primary Examiner.*

T. D. KERWIN, *Assistant Examiner.*